United States Patent Office 3,784,481
Patented Jan. 8, 1974

3,784,481
HYDROGENATION CATALYSTS CONTAINING A TRANSITION METAL SALT AND AN ALUMINUM HYDRIDE COMPOUND
Christian Lassau, Paris, Robert Stern, Marly-le-Roi, and Lucien Sajus, Croissy-sur-Seine, France, assignors to Institut Francais du Petrole, Des Carburants et Lubrifiants, Rueil-Malmaison, France
No Drawing. Continuation-in-part of application Ser. No. 856,251, Sept. 5, 1969, now Patent No. 3,663,635. This application Apr. 5, 1971, Ser. No. 131,495
Claims priority, application France, Apr. 6, 1970, 7012441; Dec. 23, 1970, 7046582
Int. Cl. C07c 5/02
U.S. Cl. 252—431 C                   12 Claims

ABSTRACT OF THE DISCLOSURE

In a process of hydrogenating an unsaturated organic compound capable of being reduced, e.g., olefins, in the presence of Ziegler-type catalysts, substantial advantages are obtained by using as the organo metallic reducing agent an aluminum hydride of the formula:

wherein $n$ is 1 or 2,
$m$ is 1,2, or 3,
Me is a metal of Group Ia or IIa of the Periodic Table,
$p$ is the valence of the metal Me,
X is OR, $NR_2$, NHR or SR,
X' is R, OR, $NR_2$, NHR or SR,
R, taken separately, is a monovalent hydrocarbon, and when taken in pairs represents —A—Z—B— wherein A and B each is alkylene, and Z is alkylene, an oxygen or sulfur atom, a NH or N-hydrocarbyl group or a polyvalent metal.

---

This application is a continuation-in-part of our patent application Ser. No. 856,251, filed Sept. 5, 1969, now Pat. No. 3,663,635.

This invention relates to a new process for hydrogenating unsaturated compounds as well as to a process for manufacturing very active catalysts which may have many uses, for example for hydrogenating unsaturated hydrocarbons. This invention also relates to the new catalysts thus obtained.

It was already known that the catalysts of the Ziegler type have some hydrogenating properties; these properties have been used for example for limiting the length of the chains obtained during the polymerization of mono- or di-olefins.

Conventional hydrogenations have also been carried out with catalysts obtained by contacting a transition metal compound with an aluminum compound of the $AlR_3$ type, wherein at least one R is a hydrocarbyl radical, the other R being hydrocarbyl radicals, halogen or hydrogen atoms or alkoxy groups.

The above catalysts have the following drawbacks:

(1) Although their hydrogenation velocity is higher than that of Raney nickel, it is not sufficiently attractive from an economic point of view since these soluble catalysts cannot be easily re-used.

(2) The alkylaluminum compounds as well as their derivatives are often inflammable, air-sensitive and difficult to handle.

(3) Reproducibility is only obtained with a particular Al/metal ratio.

(4) The hydrogenation reactions are often incomplete.

(5) A constant speed cannot be easily maintained since the reducing agent tends to decompose the active catalyst to colloidal metal which is a poorer hydrogenation catalyst, also requiring the use of a relatively high pressure.

This invention relates to a process for hydrogenating unsaturated compounds such as mono-olefins, di-oefins, polyolefins, for example polymer solutions, naphthalene, or other unsaturated compounds.

Another object of the invention is to provide catalysts exhibiting a high hydrogenating activity with respect to said unsaturated compounds, these catalysts being soluble in saturated or unsaturated hydrocarbons.

The catalysts according to the present invention comprise at least one metal compound and one aluminum hydride such as herein after defined, optionally together with an electron donor. The metal compound is a compound of a transition metal, particularly one of Group Ib, IIb, IVb, Vb, VIb, VIIb or VIII, and preferably Group VIII, of the periodic chart such as defined in Handbook of Chemistry and Physics by Charles D. Hodgman, Chemical Rubber Publishing Co., Cleveland, Ohio, 41st ed., 1959, Library of Congress Card No. 13–11056.

The anionic constituent of the metal compound may be any anion, for example halogenide, complexes such as acetylacetonate, sulfonate, for example camphor sulfonate, carboxylate such as naphthenate, oleate, stearate, 2-ethyl hexanoate or trifluoracetate.

The metal of the compound may be, for example: Co, Ni, Ti, V, Cr, Mn, Fe, Cu, Zr, Mo, Ru, Rh, Pd, Ag, W, Re, Os, Ir or Pt, and preferably nickel, cobalt or titanium.

By way of examples the following nickel and cobalt compounds may be used: dichloride, dibromide, diiodide, di-acetylacetonate, tri-acetylacetonate, naphthenate (irrespective of its metal content), oleate, stearate, 2-ethyl hexanoate and acetate.

The titanium compounds advantageously conform to the formula:

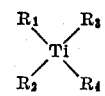

in which $R_1$, $R_2$, $R_3$ and $R_4$ are anions, for example halide, alkoxide, thio or carboxylate. A preferred structure is $TiX_2Y_2$ in which X represents halide, amino, hydrocarbylamino, thio, carboxylate, alkoxide, for example Cl, Br, I, $NR_2$, SR, OCOR, OR wherein R is alkyl, aryl, cycloalkyl, alkaryl, arylalkyl, either substituted or not, or a hydrogen atom, and Y is cyclopentadienyl (Cp), indenyl, fluorenyl or alyl, substituted or not.

Examples of such compounds are given hereinafter: $TiCl_2Cp_2$, $TiCl_2(indenyl)_2$, $Ti(OR)_2Cp_2$, $Ti(OR)_2(indenyl)_2$, $Ti(OR)ClCp_2$, $Ti(OR)Cl(indenyl)_2$,

$Ti(NR_2)_2Cp_2$ in which $R = CH_3$, $C_2H_5$, iso-$C_4H_9$, tert.-$C_4H_9$, n-$C_4H_9$, iso-$C_5H_{11}$, $C_7H_{15}$, $C_{18}H_{37}$, $C_6H_5$, $C_7H_7$.

Also with chromium a high activity has been obtained even at 20° C., although chromium is usually considered as a poor hydrogenation catalyst. Iron may also be mentioned, for example in the form of conventional compounds such as iron trichloride or iron stearate.

The choice of the reducing agent is critical to obtain catalysts which are very active and more active than those based on conventional alkyl-aluminum reducing agents.

The reducing agents of this invention belong to two types:

(1) Those of formula $AlH_nX_{3-n}$ in which $n$ is 1 or 2, X is OR, $NR_2$, NHR or SR, and R, taken separately, is a monovalent hydrocarbon radical, either linear or cyclic, substituted or not, optionally containing heteroatoms such as oxygen, nitrogen and sulfur atoms, or even metals. R may be, for example alkyl, cycloalkyl or aryl. When taken in pairs, R may represent —A—Z—B— wherein A and B each is alkylene, and Z is alkylene, an oxygen or sulfur atom, a NH or N-hydrocarbyl group or a polyvalent metal.

(2) Those of formula: $Me(AlH_mX'_{4-m})_p$ in which $m$ is 1, 2 or 3, Me is a monovalent or divalent metal selected from Groups I–A and II–A and $p$ is the valence of Me.

The X' groups, which may be identical or different, are R, OR, $NR_2$, NHR or SR groups in which R is as hereinbefore defined.

The reducing agents of the first type may be manufactured as follows:

(a) By reacting aluminum tri-hydride or a corresponding etherate with a compound containing an "acid" hydrogen, for example an acid, alcohol, amine, thiol, sulfonic acid or phenol, for example a compound of the formula ROH, RNHR' or RSH in which R and R' may be hydrocarbon radicals, for example alkyl, cycloalkyl or aryl, substituted or not, or R' may be hydrogen. By way of examples, R and R' may be ethyl, iso-butyl, undecyl, phenyl, benzyl, cumyl, tolyl, cyclopentyl, cyclohexyl, cyclohexenyl, naphthyl or acetylacetonyl; R and R' may also contain an oxygen, sulfur, nitrogen or metal atom.

(b) By reacting an aluminum hydride or a corresponding etherate with a compound containing a ketone group or any other reducible group, for example epoxy, aldehyde, quinone, carboxylic acid, ester, lactone, amide, nitrile, oxime, isocyanate, di-sulfide or sulfoxide.

The compounds of the second type may be obtained as follows:

The first method is the same as that disclosed above, except that the aluminum hydride has the formula $$Me(AlH_4)_p$$

in which Me and $p$ are as hereinbefore defined. The following are illustrative of these hydrides: $LiAlH_4$, $NaAlH_4$, $Ca(AlH_4)_2$, or their corresponding etherates such as $LiAlH_4$, 1 THF or $LiAlH_4$, 2 THF, wherein THF=tetrahydrofuran.

The second method consists of reacting a hydride of metal of Group I–A or II–A, such as LiH, NaH or $CaH_2$, with an aluminum organic compound, such as a tri-alkyl-aluminum, a dialkylaluminum hydride, a dialkylaluminum monoalkoxide, an alkylaluminum dialkoxide or an aluminum trialkoxide.

With some reducing agents, particularly those having an R substituent containing no hereto-atom such as defined hereabove, it is advantageous to contact the transition metal compound and the reducing agent in the presence of an organic compound having either one or more ether groups, for example tetrahydrofuran, diethylene glycol dimethyl ether, ethylene glycol dimethyl ether, di-ethyl ether, diethylene glycol diethyl ether, or a tertiary amine group, for example pyridine. The activity of the resulting catalyst is substantially increased in some cases. Other solvents are, for example, tetramethylene sulfone and N-methyl pyrrolidone.

It has been discovered, and this is another feature of this invention, that a high catalytic activity can be obtained in the absence of such an organic compound. Thus in a hydrocarbon medium, either saturated or not, by re-acting a reducing agent with a transition metal compound, very active hydrogenation catalysts can be obtained. This particular type of reducing agent has at least one R radical, such as defined hereabove, containing a hetero-atom such as oxygen or nitrogen. Such reducing agents may be obtained, in particular, from tetrahydrofurfuryl alcohol, an ethylene glycol monoalkyl ether, a diethylene glycol monoalkyl ether, hydroxy-pyridine or furfuryl alcohol. However it is also possible to introduce, into the reaction medium, the alcohol or amine, and then the reducing agent, for example $NaAlH_4$; $LiAlH_4$; $LiAlH_4$; 1 THF; $LiAlH_4$, 2 THF; $NaAlH_2$ (iso-butyl)$_2$ so as to manufacture the catalyst "in situ." This particular process, although more simple, gives somewhat lower activities than those obtained by the general process of this invention.

Preferred reducing agents are:

$LiAlH(O\text{-tert-butyl})_3$, $NaAlH(O\text{-tert-butyl})_3$, $AlH(O\text{-tert-butyl})_2$, $NaAlH(C_2H_5)_3$, $NaAlO_2(\text{iso-butyl})_2$,

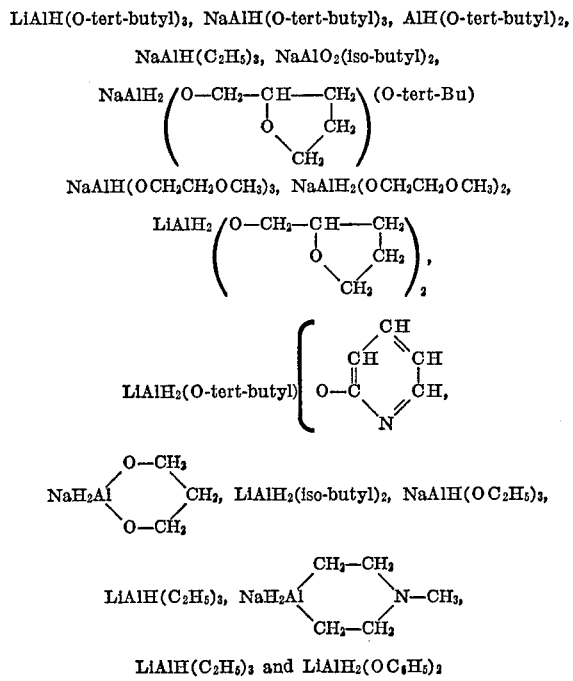

$NaAlH(OCH_2CH_2OCH_3)_3$, $NaAlH_2(OCH_2CH_2OCH_3)_2$, $LiAlH(C_2H_5)_3$ and $LiAlH_2(OC_6H_5)_2$ or their corresponding etherates.

By way of specific catalysts of this invention, the following may be mentioned:

$AlH(O\text{-tert.Bu})_2$ and $CoBr_2[P(C_6H_{11})_3]_2$ in benzene
$AlH(O\text{-tert.Bu})_2$ and $NiCl_2[P(C_6H_{11})_3]_2$ in benzene
$AlH(O\text{-tert.Bu})_2$ and $CoBr[O=P(C_6H_5)_3]_3$ in benzene
$LiAlH(O\text{-tert.Bu})_3$ and $FeCl_3$ in heptane
$NaAlH_2(O\text{-tert.Bu})_2$ and Co naphthenate in heptane
$LiAlH_2(O\text{-tert.Bu})_2$ and $VCl_2Cp_2$ in benzene
$AlH_2(O\text{-tert.Bu})$ and $Zn(\text{acetylacetonate})_2$ in heptane
$LiAlH_2(O\text{-tert.Bu})_2$ and $Cr(\text{acetylacetonate})_3$ in heptane.

The optimal molar ratio of the transition metal compound to the aluminum hydride depends on the type of aluminum hydride. It is usually 1/4 for $LiAlH(O\text{-tert.Bu})_3$ and 1/2 for $AlH(O\text{-tert.Bu})_2$.

It is usually of from 2/1 to 1/30 and preferably from 1/1 to 1/20. Since, for example, $LiAlH(O\text{-tert.Bu})_3$ is a solid, it may be easily weighed and dissolved in a small amount of a solvent such as tetrahydrofuran and used in the molar ratio of 1/4.

It has been found that certain aluminum hydrides may be used in excess, together with certain metals, without change of the reaction velocity. These usually conform to the formula $MeAlH(OR)_3$ in which R is an aryl or tert.alkyl group. With these hydrides, when used in excess, quite reproducible results may be obtained since the excess of hydride eliminates the traces of impurities such as water.

The manufacture of the catalysts may be carried out before or during the reaction. It has been possible to isolate a crystalline compound, for example in the case of titanium, cobalt and nickel, said compound containing an aluminum atom, alkoxy groups and hydrogen atoms. Its formula depends from the nature of the metal.

According to a particular embodiment, a catalyst composition is first manufactured; it is then made free of solvent and dissolved into a paraffinic hydrocarbon or a liquid polymer at a temperature slightly above 20° C. It is also possible to start with a polymer containing the metal which is thereafter reduced in solution. The polymer is precipitated subsequently.

When a heterogeneous catalyst must be used, such supports may be used as molecular sieves, alumina, silica or any other inorganic or organic material that may be sufficiently dried.

When $CoBr_2$ is used as the metal salt, it is advantageous to dissolve this salt in a small amount of tetrahydrofuran and to introduce the olefin before the reducing agent. If such complexes as $CoBr_2[PO(phenyl)_3]_2$, $CoBr_2(pyridine)$ or $CoBr_2[P(C_6H_{11})_3]_2$ are used, the catalyst may be easily manufactured under hydrogen before use and it may be stored at about 20° C. in benzene.

It is also possible to operate in the presence of a number of compounds acting as electron-donors. There will be mentioned, by way of examples, ethers, amines, heterocyclic compounds such as pyridine or quinoline, phosphine oxides, for example triphenyl phosphine oxide, tricyclohexyl phosphine oxide, trioctyl phosphine oxide, and such phosphines as tricyclohexyl phosphine.

The "electron-donors" have several uses. For example, they are useful for dissolving the reducing compound (this is the case of cyclic esters), and, above all, they improve the solubility of the metal compound.

Some compounds of this type are, however, strong inhibitors and must be avoided when high activities are desired. This is the case of ethylene-bis-diphenylphosphine, triphenylphosphine and the phosphites.

The electron-donors other than ethers, for example phosphine oxides, phosphines and amines, are usually introduced in the form of a pre-formed complex with the transition metal salt.

The hydrogenation conditions are usually mild; however one may operate under a pressure of 0.01 to 300 bars (1 bar=0.987 atm.) and at a temperature of —50 to 250° C., preferably 0 to 200° C. The concentration of the catalyst may be as low as 0.0001 gram-mol. of transition metal compound per 100 gram-mol. of the compound to be hydrogenated. The preferred concentrations are from 0.001 to 0.1 gram-mol. of transition metal compound per 100 gram-mol. of compound to be hydrogenated.

The catalysts of this invention are so active that their concentration may be lowered to a very small value, which makes often unnecessary the recovery of the catalyst and the removal of the catalyst residues from the reaction product. The reducing agents are safe to handle.

The above concentrations are given for 100 gram-mol. of hydrogenizable compound, expressed as mono-olefin. With multi-olefins, and particularly with polymers of di-olefins, the proportions must be multiplied by the number of double bonds present in each molecule.

The catalyst may be used as a soluble catalyst or a heterogeneous catalyst on an inert carrier. This catalyst may be used for hydrogenating unsaturated chemical groups. There will be mentioned, by way of example, the hydrogenation of mono-olefins, di-olefins, polyolefins or viscous solutions of polymers, for example, in hydrocarbons or polar solvents such as those mentioned hereinbefore.

The compounds which have an acetylenic unsaturation or more than one ethylenic group may be hydrogenated either completely or only partially. However the selectivity of the catalyst may be increased substantially when the hydrogenation is carried out in the presence of a tertiary amine, particularly pyridine.

This tertiary amine may be used as a complex with the transition metal compound or separately. The tertiary amines may contain from 3 to 30 carbon atoms per molecule. Trimethylamine, tri-isobutyl amine, dimethylaniline, quinoline, 2-methyl pyridine, N-methyl piperidine, N,N'-dimethyl piperazine, pyrazine, pyridine and the polymers of pyridine or another cyclic amine are examples of useful tertiary amines.

Small amounts of carbon monoxide in the hydrogenating gas, for example from 0.1 to 100 parts per million by volume, may increase further the selectivity of the process.

The ratio of the tertiary amine to the transition metal may be, for example, in the range of from 0.5 to 10 gram-mol. per gram-atom, and preferably from 0.5 to 6.

As examples of hydrogenizable compounds, the following may be named: mono-, di- and tri-olefins having, for example, up to 20 carbon atoms per molecule, for example ethylene, allene, cyclopentene, cyclododecatriene, 1,3,5-undecatriene, 1,5-cyclooctadiene, as well as the polymers of mono- and di-olefins, for example polyisoprene, polybutadiene and the styrene-butadiene co-polymers. Naphthalene may be selectively hydrogenated to tetrahydronaphthalene. Finally the ethylenic and acetylenic bonds of ethylenic and acetylenic compounds, for example ethylenic and acetylenic ethers, ketones, epoxides, anhydrides esters, and sulfones may be saturated with hydrogen.

A particular embodiment relates to the hydrogenation of cyclic polymers, particularly cyclododecatriene or cyclooctadiene, or hydrocarbon cuts containing a high proportion of the same.

It is well known that one may hydrogenate cyclododecatriene by means of heterogeneous catalysts of the Raney nickel or noble metal type. The hydrogenation of cyclododecatriene in homogeneous phase has also been described; however the catalyst were based on such alkyl-aluminum compounds as $AlR_3$ or $AlR_2X$ in which X is an OEt group. The drawbacks resulting from the use of these catalysts are known: with Raney nickel, the hydrogenation of cyclododecatriene at a low temperature is not complete, while, at a higher temperature, cyclododecane is cracked. On the other hand the separation of Raney nickel from cyclododecane (melting point: 60.7° C.) by filtration is expensive on an industrial scale and results in substantial losses of nickel. The use of noble metal catalysts has as the main drawback the cost of the catalyst and the resulting financial investment.

The homogeneous catalysts have several drawbacks for an effective industrial use. Their use is difficult since, on the one hand, it is necessary to maintain a precise molar ratio of the aluminum compound to the transition metal salt, and, on the other hand the aluminum reducing agents are highly inflammable. The concentrations of the two catalyst constituents are such that for an economic use of the process, it is necessary to recover and recycle the catalyst, which is hardly feasible; even if it were acceptable to lose the catalyst, it would be necessary to remove it from the product since, otherwise, the concentrations of metals would be too high for the main uses of cyclododecane.

The hydrogenation may be carried out batchwise or continuously and, in the latter case, with one or several reaction vessels with or without recycling of a portion of the outflow. The reaction may be carried out for example in a trikle column or in a column with perforated plates, or in an autoclave with an efficient device for dispersing hydrogen throughout the solution. When using a gradient contact column, the reactants may be passed up flow or downflow, and hydrogen may be passed in co-current flow or counter-current flow. The compound to be hydrogenated may be introduced at one or several points along the reaction vessel.

The hydrogenation effluent may be made free of any trace of metal by acid washing or by passage through a finely crushed solid adsorbent, for example alumina, silica, kieselguhr, active carbon, bleaching earth or bauxite, the contact temperature being preferably in the range of from —20 to +200° C. and the inlet pressure from 1 to 150 bars. The hourly flow rate may be for example from 0.1 to 10 liters per liter of adsorbent.

It is advantageous that the constituents of the feed charge be free from impurities. It is thus possible to use any treatment for purifying the feed charge: distillation, passage through adsorbing column (alumina, adsorbing earth and the like), or any other means.

The following examples are given for illustrative purposes only:

EXAMPLE I

A given amount of dry cobalt bromide dissolved in a few ccms. of dry tetrahydrofuran is introduced into a hydrogenation vessel (see the following table). The residual gases are removed and there is successively introduced, under hydrogen atmosphere, benzene, cyclopentene and the stoichiometrical amount of $LiAlH(O.tert.Bu)_3$ in tetrahydrofuran, i.e. a molar ratio of the cobalt salt to the aluminum compound of 1/4. The following table shows the velocities obtained at 20° C. under 92 cm. Hg. The velocities are expressed by the number of moles of $H_2$ absorbed per minute and per liter of solution. The conversion of cyclopentane is complete.

| Concentration of— | | Velocity in moles of $H_2$ per liter and per minute |
|---|---|---|
| $CoBr_2$ in millimoles per liter | Cyclopentene in moles per liter | |
| 3.13 | 1.25 | 0.440 |
| 2.82 | 1.13 | 0.426 |
| 1.45 | 1.16 | 0.354 |
| 0.73 | 1.18 | 0.272 |
| 0.297 | 1.19 | 0.099 |

The table shows that with 0.73 mmole of $CoBr_2$ per liter, i.e. about 43 mg. of cobalt per liter, it is possible to hydrogenate in 4 minutes about one mole of olefin at 20° C. under 92 cm. Hg.

EXAMPLE II

The following table gives the velocities of hydrogenation of cyclopentene obtained with use, as electron-donors, of various phosphine oxides. In the first two examples, the reducing agent is $AlH(O\text{-tert.Bu})_2$; the molar ratio of the cobalt salt of the reducing agent is 1/2.

In the last three examples, the reducing agent is $LiAlH(O.tert.Bu)_3$ the molar ratio of the cobalt salt to the reducing agent is 1/4. These hydrogenations have been carried out in benzene under a pressure of 92 cm. The concentrations of cobalt bromide are 1 mmole per liter.

| Complex | Cyclopentene concentration, moles/liter | Reaction temperature, ° C. | Velocity (moles/min./liter) |
|---|---|---|---|
| $CoBr_2[PO(naphthyl)_3]_2$ | 1.52 | 29 | 0.026 |
| $CoBr_2[PO(phenyl)_3]_2$ | 1.07 | 22 | 0.077 |
| $CoBr_2[PO(isobutyl)_3]_2$ | 1.08 | 29 | 0.033 |
| $CoBr_2[PO(octyl)_3]_2$ | 2.54 | 23 | 0.029 |
| $NiBr_2[PO(octyl)_3]_2$ | 2.69 | 23 | 0.028 |

EXAMPLES III TO XI

Hydrogenation of 1-hexene with titanium catalysts:

The experiments are carried out by injecting successively and the titanium compound dissolved in a small amount of benzene.

The catalyst manufacture is carried out under $H_2$ or an inert gas free from oxygen. When the violet or brown color appears, according to the case, the mixture is stirred up and the hydrogen absorption is measured.

The velocity is given by the number of moles of $H_2$ absorbed per minute and per liter of solution containing 0.9 to 3 millimoles of titanium compound and 1 to 2 moles olefin.

The conversion to cyclopentane or hexane is always complete.

In some cases the velocities are higher than those obtained with cobalt and are definitely higher than those obtained with conventional techniques.

EXAMPLE XII 0.2 mmole of $FeCl_3$ (10 mg. of iron) dissolved in a small amount of tetrahydrofuran, 5 cc. of cyclopentene (57 mmoles) and 15 cc. of benzene are introduced into a reaction vessel. 0.88 mmole of $LiAlH_2(OR)_2$ wherein R is tert.$C_4H_9$ are introduced thereafter. The hydrogenation velocity is 94 cc./mn. i.e. 142 mmoles·l.$^{-1}$·mn.$^1$ for a $FeCl_3$ concentration of 7.27 mmoles·l.$^{-1}$ at 27° C. and under one atmosphere of $H_2$. When the hydrogenation is complete, isoprene (2 cc.) is injected, which is completely hydrogenated at a velocity of 86 cc./mn. i.e. 122 mmoles·l.$^{-1}$·mn.$^{-1}$.

EXAMPLE XIII

Chromium chloride is admixed with $PO(C_8H_{17})_3$ to be made soluble in benzene, 0.4 mmole of the formed complex is introduced into a hydrogenation reactor and cyclopentene (5 cc.), benzene and the reducing agent, i.e. 1.6 mmoles of $LiAlH_2(OR)_2$ in which R=tert.$C_4H_9$ are successively injected. The velocity is 25 cc./mm. at 20° C., i.e. 40 mmoles·l.·$^{-1}$mn.$^{-1}$.

EXAMPLES XIV TO XX

These examples illustrate the use of a cobalt salt with various reducing agents.

The following table shows the use of various reducing agents in the hydrogenation of cyclopentene at 20° C./92 cm./Hg. The solutions contained from 0 to 85% of tetrahydrofuran:

| Reducing agents | B | A | Reducing agent/ cobalt salt (molar ratio) | Velocity, moles · l.$^{-1}$ · mn.$^{-1}$ |
|---|---|---|---|---|
| $LiAlH(OMe)_3$ | 1 | 0.6 | 4 | 0.109 |
| $AlH(OR)_2$ | 2.54 | 4.5 | >10 | 0.133 |
| $LiAlH(OR)_3$ | 0.99 | 0.24 | 15 | 0.314 |
| $LiAlH_2(OR)_2$ | 1.12 | 0.48 | 5 | 0.081 |
| $AlH_2(OR)$ | 1.18 | 2.94 | 3 | 0.180 |
| $AlH\left(N{<}{Bu \atop Bu}\right)_2$ | 0.93 | 2.32 | >10 | 0.090 |
| $NaAlH(OR)_3$ | 1.13 | 0.57 | >20 | 0.515 |

Note.—A=concentration of the cobalt salt (millimoles per liter); B=concentration of olefine (moles per liter); R=tert.$C_4H_9$; Me=methyl. The cobalt salt was $CoBr_2[PO(C_8H_{17})_3]_2$.

| Complex | A | Reducing agents | B | C | T°C. | Velocity, moles·l.$^{-1}$: mn.$^{-1}$ |
|---|---|---|---|---|---|---|
| $Ti(OPh)_3Cp_2$ | 1.17 | $LiAlH_2(OPh)_2$ | 3 | 1.88 | 20 | 1.97 |
| $Ti(OPh)_2Cp_2$ | 0.76 | $LiAlH_2(Ot\text{-}C_4H_9)_2$ | 4 | 1.25 | 20 | 2.22 |
| $Ti(OPh)_2CP_2$ | 1.11 | $LiAlH_2(Ot\text{-}C_4H_9)_2$ | 4 | 1.78 | 20 | 3.03 |
| $Ti(OPh)ClCp_2$ | 0.68 | $LiAlH_2(Ot\text{-}C_4H_9)_2$ | 4 | 1.10 | 20 | 2.32 |
| $TiCl_2Cp_2$ | 6.31 | $LiAlH_2(Ot\text{-}C_4H_9)_2$ | 2.5 | 1.33 | 20 | 0.895 |
| $Ti(SPh)_2Cp_2$ | 2.50 | $LiAlH_2(Ot\text{-}C_4H_9)_2$ | 4 | 0.84 | 20 | 0.270 |
| $Ti(OPh)_2Cp_2$ a | 2.13 | $LiAlH_2(Ot\text{-}C_4H_9)_2$ | 3 | 1.70 | −25 | 1.79 |
| $TiCl_2Cp_2$ b | 0.91 | $LiAlH(Ot\text{-}C_4H_9)_3 + AlH_3$ | 30/15/1 | 0.73 | 20 | 0.485 |
| $TiCl_2Cp_2$ | 2.85 | $LiAlH_2(Ot\text{-}C_4H_9)_2$ | 4 | 1.14 | 20 | 0.396 | a With cyclopentene instead of 1-hexene.
b The catalyst was previously reduced, evaporated to dryness at 80° C. and melted in paraffin.
Note.—Cp=cyclopentadiene; Ph=phenyl; A=concentration of Ti complex in millimoles per liter; t-$C_4H_9$=tert.butyl; B=Molar ratio of reducing agent to titanium compound; C=concentration of olefin in moles per liter.

The velocities are expressed as the number of hydrogen moles absorbed per liter and per minute.

In all cases the conversion to cyclopentane was quantitative.

EXAMPLES XXI TO XXIV

Various cobalt salts may be used for the hydrogenation of cyclopentene to cyclopentane.

$t=20°$ C.; $p=92$ cm. Hg. The reducing agent is LiAlH(OR)$_3$, in which R is tert.butyl, used in excess; L is PO(C$_8$H$_{17}$)$_3$. The velocities are expressed as moles·l$^{-1}$·mn.$^{-1}$. The results are given hereafter:

| Complex | A | Reducing agent/cobalt salt (molar ratio) | B | Velocity, moles·l.$^{-1}$· mn.$^{-1}$ | Conversion, percent |
|---|---|---|---|---|---|
| Co(acetylacetonate)$_2$ | 0.45 | 25 | 0.9 | 0.2 | 100 |
| CoBr$_2$L$_2$ | 0.23 | 50 | 0.92 | 0.46 | 100 |
| CoBr$_2$ | 0.23 | 50 | 0.93 | 0.358 | 100 |
| Co acetate plus 6L | 0.47 | 15 | 0.945 | 0.337 | 100 |

NOTE.—A=concentration of cobalt II in mmoles·l.$^{-1}$; B=concentration of cyclopentene in moles·l.$^{-1}$.

Cyclopentane was recovered with a substantially quantitative yield.

EXAMPLE XXV 150 ml. of cyclododecatriene are introduced into a reaction vessel from which air has been removed and thereafter heated up to 80° C. Hydrogen is thereafter added under a pressure of 30 atmospheres, and then 0.3 millimole of LiAlH(OR)$_3$ wherein R is tert.butyl, dissolved in 1 ccm. of tetrahydrofuran, and finally 0.05 mmole of cobalt naphthenate. The reaction is complete after 1 hour and a half during which the stoichiometrical amount of hydrogen is absorbed. After cooling, cyclododecane is withdrawn in the form of a crystalline white powder. The bromine number shows that not even one part of olefin per thousand parts of cyclododecane has remained unconverted. The content of cobalt of the obtained cyclododecane is only 22 p.p.m. The ramining tetrahydrofuran may be removed by a further physical treatment.

EXAMPLE XXVI

Example 25 is repeated, except that cyclododecatriene is dissolved in heptane. The reaction is conducted at 50° C. for one hour. The obtained solution of cyclododecane in heptane has a bromine number of zero.

EXAMPLE XXVII

Example 25 is repeated, except that the reducing agent is NaAlH(OR)$_3$ in which R is tert.butyl. Comparable results are obtained.

EXAMPLE XXVIII

Example 25 is repeated, except that a previously reduced solution of cobalt naphthenate in cyclododecatriene is injected into cyclododecatriene at 80° C. Once hydrogen has been absorbed, the gases are removed, the vessel is cooled down and cyclododecane is recovered free from the solvent of the reducing agent.

EXAMPLE XXIX

Example 25 is repeated with cyclooctadiene, and cyclooctane is obtained with a quantitative yield.

EXAMPLE XXX 140 ccm. of cyclododecatriene, 0.15 millimole of NaAlH$_2$(isobutyl)$_2$ and finally 0.025 millimole of cobalt stearate dissolved in 5 ccm. of cyclododecatriene are introduced into a pressurized vessel, in the presence of hydrogen. After heating up to 90° C., there is obtained a complete hydrogenation of cyclododecatriene to cyclododecane.

EXAMPLE XXXI

Into an autoclave which previously has been cleared of air and moisture, there are charged 45 ml. of freshly distilled cyclopentadiene; then there is injected the catalyst resulting from the action of 0.15 millimole of NaAlH$_2$(O-tert-butyl)$_2$ on 0.05 millimole of nickel stearate in the presence of 0.2 millimole of pyridine. At the same time there is injected 7 ml. of heptane, for internal standardization. The operation is carried out at 25° C. under 30 bars of hydrogen.

The operation is followed by the taking of test samples, which are analysed by chromatography in the gaseous phase.

The operation can be stopped at the end of about 90 minutes. By then, the cyclo-pentadiene has been entirely converted. The molar selectivity in cyclo-pentene is 97.5%; that of dicyclopentadiene, 0.5%; that of cyclopentane, 2%.

This example shows the high conversion and the very great selectivity which can be obtained with such a catalyst.

EXAMPLE XXXI-A

Example XXXI is repeated, however, the operation is carried out without pyridine. The selectivity in cyclopentene is at most 80%. The selectivity in dicyclopentadiene is about 1%; that in cyclopentane, 19%.

EXAMPLE XXXII

Example XXXI is repeated, but pyridine is replaced by tri-ethylamine. There is obtained, for a conversion of 99%, a maximum selectivity of cyclopentene of 95%.

EXAMPLE XXXIII

Example XXXI is repeated, but cobalt stearate is used instead of nickel stearate. The hydrogenation is produced at a speed about 100 times weaker than in Example 1.

EXAMPLE XXXIV

After having removed the air from a reactor, there is introduced therein 100 cm.$^3$ of cyclohexane and 10 cm.$^3$ of hexyne-1, then the catalyst obtained by the action of 0.1 millimole of nickel octoate upon 0.2 millimole of NaAlH$_2$(OCH$_2$CH$_2$OCH$_3$)$_2$ in the presence of 0.2 millimole of pyridine. The entirety is brought to 90° under 30 bars of hydrogen. When the theoretical quantity of hydrogen is absorbed, the liquid phase is drawn off. The selectivity of hexene is 95% for a total conversion of hexyne-1.

EXAMPLE XXXV

Example XXXIV is repeated, replacing hexyne-1 by propyne dissolved in cyclohexane. The selectivity is 98% for a conversion of 100%.

If the hydrogen used contains 10 p.p.m. of carbon monoxide, the selectivity obtained is 98.6%.

EXAMPLE XXXVI

Example XXXIV is repeated, replacing propyne by butadiene dissolved in cyclohexane and operating at 35° C. with hydrogen containing 10 p.p.m. of carbon monoxide.

The selectivity is 98.5% for a conversion of butadiene equal to 100%.

A test made, by way of comparison, with very pure hydrogen, has given a selectivity of 97.5%.

EXAMPLE XXXVII 0.3 millimole of $NaAlH_2(O\text{-tert.butyl})_2$ and 0.1 millimole of cobalt stearate in toluene have been used to hydrogenate at 100–130° C. and 10–30 atmospheres:

(a) sulfolene to sulfolane
(b) $n\text{-}C_4H_9\text{—}O\text{—}CH=CH_2$ to $n\text{-}C_4H_9\text{—}O\text{—}CH_2\text{—}CH_3$
(c) methyl acrylate to methyl propionate
(d) maleic anhydride to succinic anhydride
(e) ethylacrylate to ethyl propionate
(f) allyl acetate to propyl acetate
(g) ethyl linolate to ethyl stearate
(h) ethylvinyl ketone to diethyl ketone
(i) naphthalene to tetrahydronaphthalene.

In all cases the yield was practically quantitative.

What is claimed is:

1. A composition, useful as a hydrogenation catalyst and soluble in the free form in saturated or unsaturated hydrocarbons, consisting essentially of a reduction product resulting from contacting: (a) a reducible nickel, cobalt or iron compound selected from the group consisting of halides, sulfonates, carboxylates and complexes with acetylacetonate,

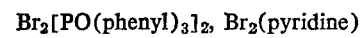

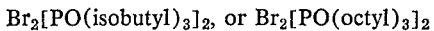

with (b) an aluminum hydride of the formula $$Me[AlH_mX'_{m-4}]_p$$

wherein

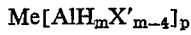

Me is a metal of Group Ia or IIa of the Periodic Table,
$p$ is the valence of the metal Me,
$X'$ is OR, $NR_2$, NHR or SR,
R, taken separately, is a monovalent hydrocarbon, and when taken in pairs represents —A—Z—B— wherein A and B each is alkylene, and Z is alkylene, oxygen, sulfur, NH or N-hydrocarbyl.

2. A composition according to claim 1 wherein said reducible compound is a trifluoroacetate.

3. A composition according to claim 1 wherein the reducible metal compound is a nickel compound.

4. A composition according to claim 1, wherein the reducible metal compound is a cobalt compound.

5. A composition as defined in claim 1, wherein Me is lithium, sodium or calcium.

6. A composition as defined by claim 1 wherein the molar ratio of the reducible metal compound to the aluminum hydride is 2:1 to 1:30, respectively.

7. A composition as defined by claim 1 wherein the molar ratio of the reducible metal compound to the aluminum hydride is 1:1 to 1:20, respectively.

8. A composition as defined by claim 1 wherein said aluminum hydride is selected from the group consisting of $LiAlH(O\text{-tert-butyl})_3$, $NaAlH(O\text{-tert-butyl})_3$, $NaAlH(C_2H_5)_3$,

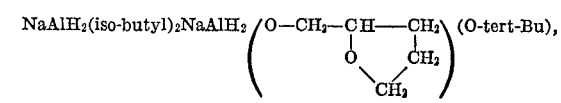

$NaAlH(OCH_2CH_2OCH_3)_3$,

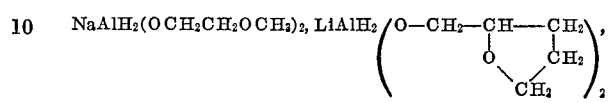

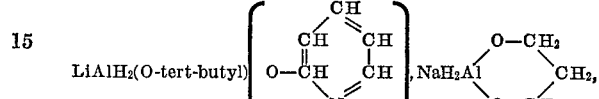

$LiAlH_2(\text{iso-butyl})_2$, $NaAlH(OC_2H_5)_3$, $LiAlH(C_2H_5)_3$,

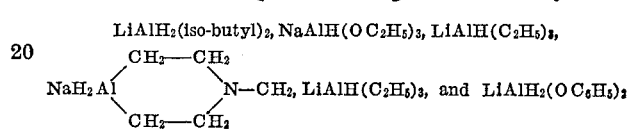

and the corresponding tetrahydrofuran etherates thereof.

9. A composition according to claim 7, wherein the reducible metal compound is a nickel compound.

10. A composition as defined by claim 1 wherein R represents —A—Z—B— wherein A and B each is alkylene.

11. A composition as defined by claim 1 wherein X' represents —A—Z—B—, and Z is oxygen, sulfur, NH or N-hydrocarbyl group.

12. A composition as defined by claim 1 wherein X' represents OR, $NR_2NHR$ or SR, and wherein R represents —A—Z—B—.

References Cited

UNITED STATES PATENTS

| | | | |
|---|---|---|---|
| 3,027,360 | 3/1962 | Raum | 252—429 C |
| 3,112,297 | 11/1963 | Gordon et al. | 252—429 C |
| 3,131,155 | 4/1964 | Luttinger | 252—429 C |
| 3,231,515 | 1/1966 | Ziegler et al. | 252—429 A |
| 3,557,075 | 1/1971 | Gaeth | 252—429 C |
| 3,058,970 | 10/1962 | Rust et al. | 252—429 B |
| 3,078,262 | 2/1963 | Herman et al. | 252—429 B |
| 3,502,637 | 3/1970 | Marullo et al. | 252—429 B |
| 3,524,899 | 8/1970 | Candlin et al. | 252—431 L |
| 3,536,632 | 10/1970 | Kroll | 252—431 |

FOREIGN PATENTS

| | | | |
|---|---|---|---|
| 1,117,318 | 6/1968 | Great Britain | 252—429 A |

PATRICK P. GARVIN, Primary Examiner

U.S. Cl. X.R.

252—429 A, 429 B, 429 C, 431 R, 431 N; 260—666, 683.9